United States Patent [19]

Takato et al.

[11] Patent Number: 5,127,489
[45] Date of Patent: Jul. 7, 1992

[54] SUSPENSION APPARATUS FOR ENGINE EXHAUST SYSTEM

[75] Inventors: Koji Takato, Hiroshima; Masayuki Kawata, Higashihiroshima, both of Japan

[73] Assignee: Mazda Motor Corporation, Hiroshima, Japan

[21] Appl. No.: 544,528

[22] Filed: Jun. 28, 1990

[30] Foreign Application Priority Data

Jun. 28, 1989 [JP] Japan .................... 1-75889

[51] Int. Cl.⁵ ............................. B60K 13/04
[52] U.S. Cl. .................... 180/309; 248/60
[58] Field of Search ........... 181/241, 243; 248/60, 248/608, 609, 610, 635; 180/309

[56] References Cited

U.S. PATENT DOCUMENTS

| | | | |
|---|---|---|---|
| 2,026,446 | 12/1935 | Trott | 181/243 X |
| 2,685,178 | 8/1954 | Eck | 248/635 X |
| 2,912,198 | 11/1959 | Feil, Jr. | 248/60 X |
| 4,696,366 | 9/1987 | Hattori | 180/309 X |

FOREIGN PATENT DOCUMENTS 8428 1/1983 Japan .................... 180/309

Primary Examiner—Andres Kashnikow
Assistant Examiner—Michael Mar
Attorney, Agent, or Firm—Fleit, Jacobson, Cohn, Price, Holman & Stern

[57] ABSTRACT

An engine exhaust system is suspended from a power plant and a car body by a suspension apparatus so as to support an exhaust pipe, at a plurality of points, from a power plant system. A muffler is connected to the engine exhaust pipe and suspended, at a rear end of the muffler only, from the car body. The elastic suspension member includes an elastic block to be attached to the power plant or car body and a rigid bracket to hold the exhaust system.

7 Claims, 3 Drawing Sheets

SUSPENSION APPARATUS FOR ENGINE EXHAUST SYSTEM

FIELD OF THE INVENTION

The present invention relates to a suspension apparatus for an engine exhaust system.

BACKGROUND OF THE INVENTION

Typically, automotive engines have engine power plants including a power train having at least a transmission and a differential, operationally coupled to each other, and engine exhaust systems including an exhaust pipe, a catalytic converter and a muffler. Such a power train is supported or held by a power plant frame directly secured to a car body to be installed on the automotive vehicle. However, the engine exhaust system is attached to the power plant frame so as to be suspended from the car body. In order to prevent engine vibration from being transmitted to the car body, flexible mounting members or elastic suspension members are used between the engine exhaust system and power plant frame. Such a suspension apparatus, including flexible mounting or elastic suspension members, is known from, for example, Japanese Utility Model application 61(1986)-36514, entitled "Suspension Apparatus For Engine Exhaust System," filed on Mar. 13, 1986 and laid open on Sep. 19, 1987 as Japanese Unexamined Utility Model Publication No. 62(1987)-148717.

In spite of the use of the elastic suspension members, however, since the engine exhaust system is directly suspended from the car body, the transmission of engine vibration to the car body through the engine exhaust system is not always completely prevented.

For the purpose of providing a brief technical background on eliminating the transmission of such vibration to the car body from the engine through the engine exhaust system, reference is made to FIGS. 1 to 4. An engine 2 is provided with and operationally, directly coupled to a power plant, having a transmission 3 and a differential 4 which are connected to each other and suspended by a power plant frame 5. The power plant frame 5 is firmly secured to the car body 10 (partly shown) in a well known manner. The engine 2 is further provided with and directly connected to an engine exhaust system, having an exhaust pipe 1 directly connected to the engine 2, a catalytic converter 11 disposed in the middle of the engine exhaust pipe 1 and a muffler 7 connected to an end of the exhaust pipe 1 remote from the engine 2. The engine exhaust system is suspended from the car body in such a way as to connect the exhaust pipe 1 to the power plant frame at two points, i. e., to the transmission 3 and the power plant frame 5 by elastic suspension members 6, and the muffler 7 directly to the car body 10 at front and rear ends of the muffler 7 by elastic suspension members 9.

A typical elastic suspension member, used as the elastic suspension members 6 and 9, is shown in FIG. 4. The elastic suspension members 6 and 9, which have the same structure and function as one another, comprise an elastic suspension block A made of, for instance an elastic rubber material, a sleeve-like metal spacer B, fitted in the elastic suspension block A and partly projecting from the elastic suspension block A, and a hanger arm or bracket C, attached to the elastic suspension bolt A by a bolt E and nut F through a heat insulation member D mounted on the projecting part of the spacer B.

Such an engine exhaust system suspension structure is apt to generate a great deal of stress at the juncture 1a between the exhaust pipe 1 and muffler 7 of the engine exhaust system, due to the phase difference of vibration between the power plant system and car body 10 as is shown in FIG. 2. The generation of such a great deal of stress causes damage to either one of or both the exhaust pipe 1 and muffler 7 at the juncture 1a.

For this reason, the exhaust pipe 1 could be improved so as to itself absorb engine vibration transmitted therethrough by utilizing, for instance, a flexible pipe 12, as part of the exhaust pipe 1, disposed between the catalytic converter 11 and muffler 7, as is shown in FIG. 3. The use of a flexible exhaust pipe such as pipe 12, however, increases the cost of engine exhaust system and causes somewhat troublesome installation operation of the engine exhaust system on the car body.

SUMMARY OF THE INVENTION

It is, therefore, a primary object of the invention to provide a suspension apparatus for an engine exhaust system which prevents or considerably decreases the transmission of engine vibration to a car body.

An engine exhaust system suspension apparatus according to the present invention comprises elastic suspension means for suspending an engine exhaust pipe, at a plurality of points, from a power plant system and a muffler connected to the downstream end of the engine exhaust pipe, at its rear end only, from part of the car body.

The elastic suspension means comprises a plurality of elastic suspension members, each having an elastic suspension block and a rigid hanger bracket. The elastic suspension block is made of an elastic material, such as a synthetic or natural rubber, and is directly attached to the power plant system or the car body. The rigid hanger bracket, secured to the elastic suspension block with a heat insulation pad or member inserted therebetween, holds the engine exhaust pipe or the muffler of the engine exhaust system.

BRIEF DESCRIPTION OF THE DRAWINGS

The above and other objects and features of the present invention will be apparent from the following description of a preferred embodiment when considered in conjunction with the appended drawings, in which.

DESCRIPTION OF THE PREFERRED EMBODIMENT

Figure 1:
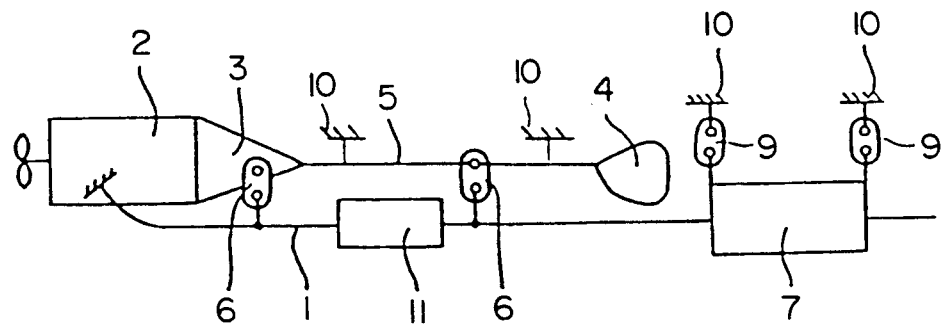
FIG. 1 is a schematic illustration showing a prior art suspension apparatus for an engine exhaust system.
Figure 2:
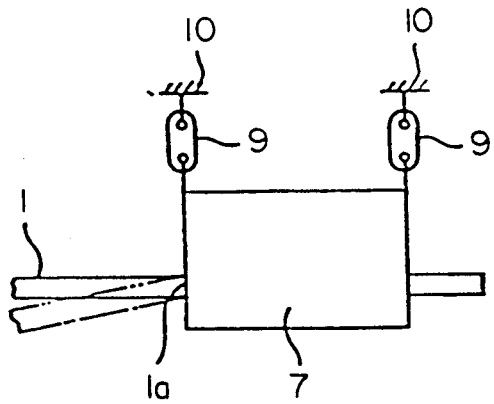
FIG. 2 is an illustration showing the state of motion of an exhaust pipe of the prior art suspension apparatus of FIG. 1.
Figure 4:
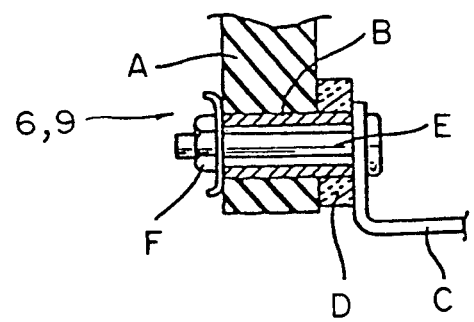
FIG. 4 is a cross-sectional view of part of an elastic suspension member used in the prior art suspension apparatus of FIG. 1.
Figure 3:
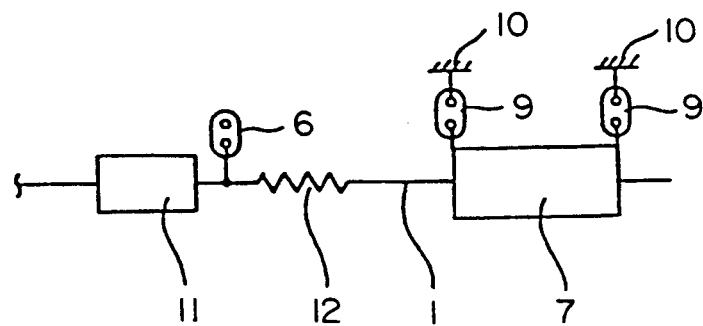
FIG. 3 is a schematic illustration showing a variant of the prior art suspension apparatus of FIG. 1.
Figure 5:
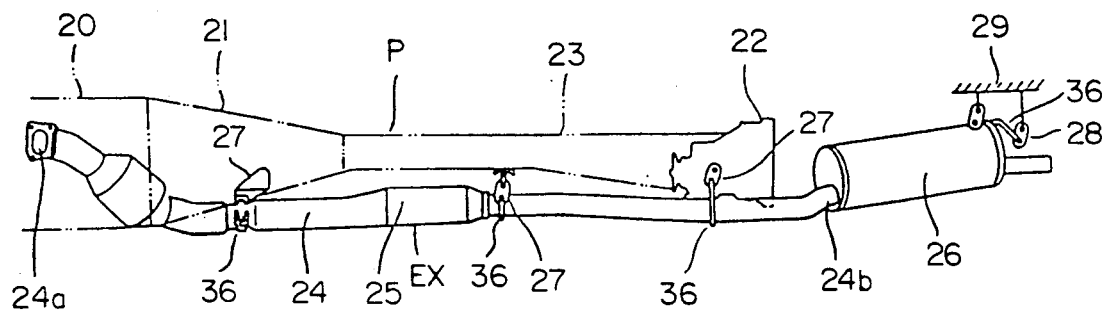
FIG. 5 is a side view of an engine exhaust system suspended from a power plant by a suspension apparatus in accordance with a preferred embodiment of the present invention.
Figure 6:
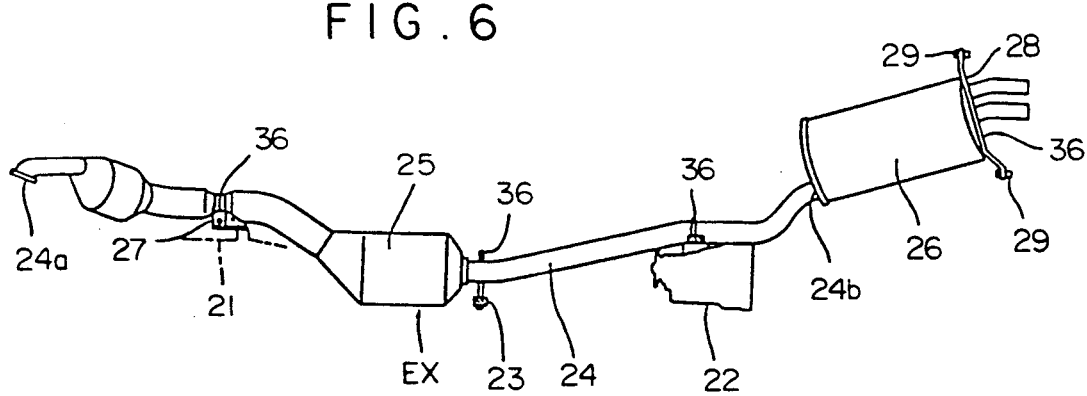
FIG. 6 is a plan view of FIG. 5.
Figure 7:
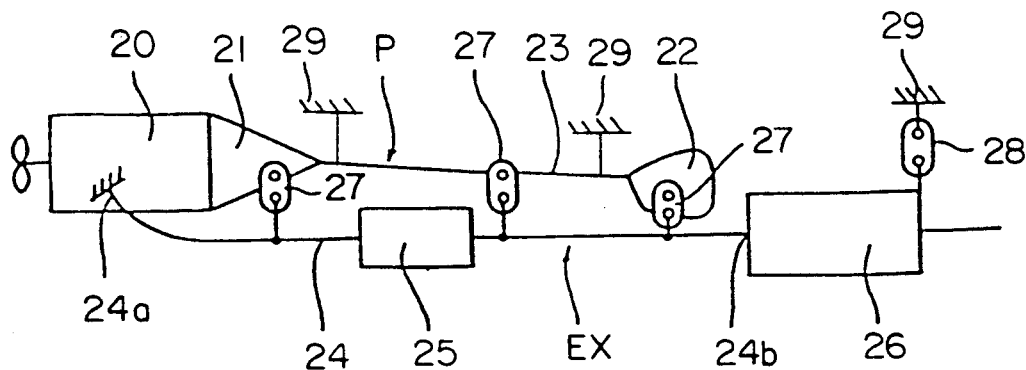
FIG. 7 is a schematic illustration, similar to FIG. 1, showing the suspension apparatus of FIG. 5.

Referring to the drawings in detail, in particular FIGS. 5 and 6, a power plant with an engine exhaust system suspended by a suspension apparatus according to a preferred embodiment of the present invention is shown and generally indicated by a reference character P. The power plant P includes an engine 20, a transmission 21 and a differential 22, all of which are arranged in order from the front toward the back of a vehicle. The transmission 21 and differential 22 are supported and connected to each other by a power plant frame 23 secured to the car body 29. Such a power plant and its arrangement is well known to those skilled in the art. The engine 21 is provided with an engine exhaust system generally designated by a reference character EX. The engine exhaust system EX includes an exhaust pipe 24 with the upstream end 24a thereof directly connected to the engine 20, a catalytic converter 25 disposed in the exhaust pipe 24 and a muffler 26 connected to the downstream end 24b of the exhaust pipe 24.

The exhaust system EX is suspended partly from the power plant P and partly from the car body 29 by elastic suspension members 27 and 28, respectively. Specifically, the exhaust pipe 24 of the engine exhaust system EX is suspended by a plurality of, for instance three, elastic suspension members 27 attached to the transmission 21, power plant frame 23 and differential 22. The muffler 26 of the engine exhaust system EX is suspended, at its rear end, by two elastic suspension members 28 attached to the part of the car body 29.

Figure 9:
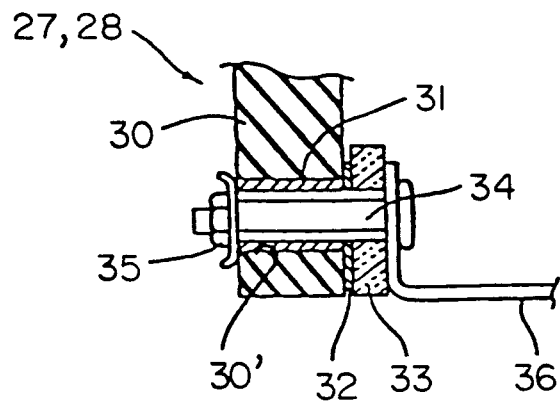
FIG. 9 is a cross-sectional view, similar to FIG. 4, showing part of an elastic suspension member used in the suspension apparatus of FIG. 5.

The elastic suspension members 27 and 28 are the same in structure and function as one another. As is shown in FIG. 9, each elastic suspension member 27 or 28 comprises an elastic suspension block 30, made of, for instance, either synthetic or natural rubber material, and a hanger arm or bracket 36, formed from, for instance, a rigid metal rod. The elastic suspension block 30 is secured to the power plant P or the car body 29 in an appropriate manner well known in the art. The elastic suspension block 30 is formed with a bore 30', in which a cylindrical sleeve-like spacer 31, made of a material such as a metal and having a length equal to the thickness of the elastic suspension block 30, is firmly fitted. Between the elastic suspension block 30 and hanger bracket 36, a washer 32 and a heat insulation pad or member 33 are inserted. The hanger bracket 36 and the washer 32 and heat insulation member 33 are firmly fastened all together to the elastic suspension block 30 with a bolt 34 and nut 35. It should be noted that the hanger bracket 36 is shaped to fit the configuration of part of the engine exhaust system EX which it holds.

To practically suspend the engine exhaust system EX, the elastic suspension block 30 with the spacer 31 having been inserted therein is secured first to the counterpart of the power plant P or the car body 29. After engaging the hanger bracket 36 with the exhaust pipe 24, the bolt 34, to which the hanger bracket 36, heat insulation member 33 and washer 32 have been attached together, is inserted into the spacer 31. Then, the nut 35 is threaded onto the bolt 34 to fasten firmly the hanger bracket 36 to the elastic suspension block 30. In such a way, the engine exhaust system EX is suspended from the power plant P and the car body 29.

Figure 8:
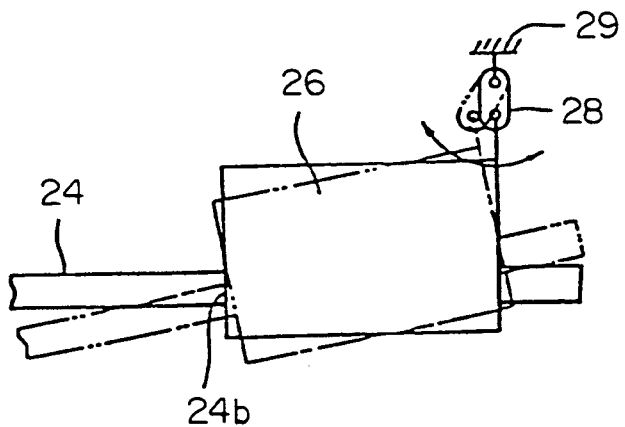
FIG. 8 is an illustration, similar to FIG. 2, showing the state of motion of an exhaust pipe of the suspension apparatus of FIG. 7.

Because the muffler 26 is suspended, at its rear end only, from the car body 29 separately from the other parts of the engine exhaust system EX, the engine exhaust system EX transmits less engine vibration to the car body 29. Furthermore, as is apparent from FIG. 8, which shows the state of motion of the downstream part of the engine exhaust system EX, the muffler 26 moves or oscillates about the suspended end, so that the engine exhaust system EX eliminates the generation of stress at the juncture 24b between the exhaust pipe 24 and muffler 26, and hence damage to the exhaust pipe 24 or muffler 26 at the juncture 24a.

In the prior art elastic suspension member 6 or 9, having the heat insulation member E mounted on the metal spacer B, breakage and physical degradation of the suspension block A can easily occur due to heat transmitted from the engine exhaust system through the direct contact between the spacer B and hanger bracket C, because of the indirect connection between the suspension block 30 and hanger bracket 36 with the metal washer 32 and heat insulation member 33 inserted therebetween. By comparison, the suspension member 27 or 28 of the present invention serves with high heat insulation efficiency and prevents the suspension block 30 from breakage and physical degradation due to heat.

It is to be understood that although the invention has been described in detail with reference to a preferred embodiment thereof, nevertheless, various other embodiments and variants are possible which are within the spirit and scope of the invention, and such are intended to be covered by the following claims.

What is claimed is:

1. A suspension apparatus for suspending an engine exhaust system from a car body of a vehicle, comprising:

a power plant system including an engine, a transmission, and a differential;

a power plant supporting frame secured to said car body and supporting at least said transmission and said differential, said engine exhaust system extending in a longitudinal direction relative to said vehicle and having an exhaust pipe with one end directly connected to said engine and another end, remote from said engine, connected to a muffler; and elastic suspension means for insulating said engine exhaust system from engine vibration and suspending said exhaust pipe, from said power plant system, at a plurality of points, said elastic suspension means including a first suspension block suspending a rearmost end of said muffler from said car body, said first suspension block being the only connection between said muffler and said car body, said elastic suspension means further including a second suspension block between said differential and said exhaust pipe, said rearmost end being an end of said muffler remote from said engine, said first suspension block permitting said muffler to pivotally oscillate about said rearmost end, relative to said car body, around an axis oriented substantially at a right angle relative to said longitudinal direction under said engine vibration.

2. A suspension apparatus as defined in claim 1, wherein said exhaust pipe is suspended from at least two points on both sides of a catalytic converter disposed in said exhaust pipe.

3. A suspension apparatus as defined in claim 1, wherein said elastic suspension means further comprises at least one hanger bracket which is attached to at least said second suspension block and holds said engine exhaust system.

4. A suspension apparatus as defined in claim 3, wherein each elastic suspension block is made of a rubber.

5. A suspension apparatus as defined in claim 3, wherein each of said first and second suspension blocks has a hollow spacer inserted to its full length therein, each hollow spacer having a length not greater than a thickness of the suspension block in which it is inserted, and a bolt and nut for fastening said hanger bracket to each of said first and second suspension blocks through one of said hollow spacers.

6. A suspension apparatus as defined in claim 5, and further comprising a heat insulation member inserted between each of said elastic suspension blocks and one of the hanger brackets.

7. A suspension apparatus as defined in claim 6, and further comprising a washer inserted between each of said elastic suspension blocks and one of the heat insulation members.

* * * * *